United States Patent [19]
Markham

[11] Patent Number: 5,832,877
[45] Date of Patent: Nov. 10, 1998

[54] PET TOY PRODUCT WITH INTEGRAL TREAT RECEIVING RECEPTACLES

[75] Inventor: Joseph P. Markham, Arvada, Colo.

[73] Assignee: Bounce, Inc., Golden, Colo.

[21] Appl. No.: 845,110

[22] Filed: Apr. 21, 1997

[51] Int. Cl.[6] .................................................. A01K 29/00
[52] U.S. Cl. ........................................................... 119/710
[58] Field of Search .................................... 119/707, 709, 119/710, 711

[56] References Cited

U.S. PATENT DOCUMENTS

| | | | |
|---|---|---|---|
| 3,368,528 | 2/1968 | Ganoe | 119/709 |
| 5,595,142 | 1/1997 | Chill | 119/710 |

FOREIGN PATENT DOCUMENTS

| | | | |
|---|---|---|---|
| 2402346 | 7/1975 | Germany | 119/709 |

OTHER PUBLICATIONS

Brochure, "Recipe for the Perfect Dog", The Kong Company, 1997.

*Primary Examiner*—Robert P. Swiatek
*Attorney, Agent, or Firm*—Fields and Johnson, P.C.

[57] ABSTRACT

An elongated elastomeric pet toy includes a longitudinal panel with first and second lips formed along opposite respective longitudinal edges of the panel. These edges are folded over to form respective bights which serve as deformable hollow shape-retaining receptacles for receiving an animal treat. The lip forms a longitudinal slit along the panel through which the treat can be inserted in the respective receptacles. When the animal chews on the pet toy, the treats will be forced out through the longitudinal slit so that the animal can eat them. Also, the receptacles may have open ends through which the treats can be inserted by a person and dispensed from the toy by the animal chewing on the toy. In one embodiment, the lips are folded over on the same side of the longitudinal panel to create bights which form adjacent receptacles. In another embodiment, the lips are folded on opposite sides of the longitudinal panel to create bights which form receptacles on opposite sides of the panel.

24 Claims, 3 Drawing Sheets

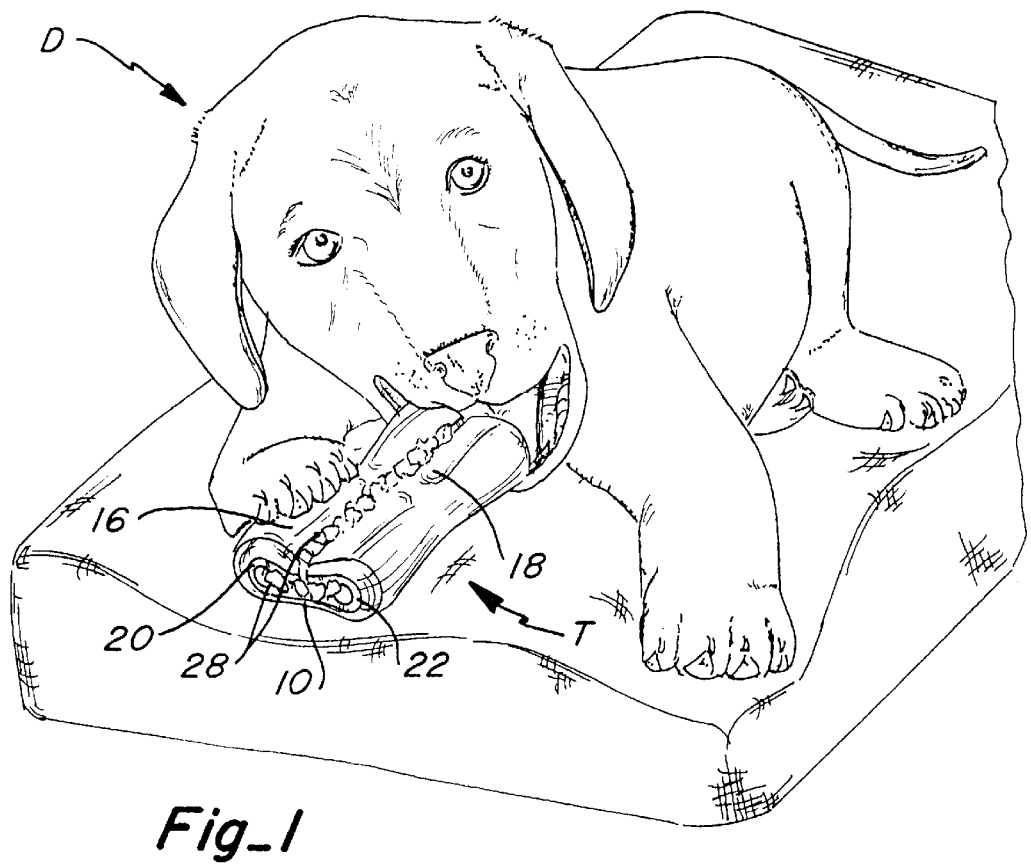
Fig_1
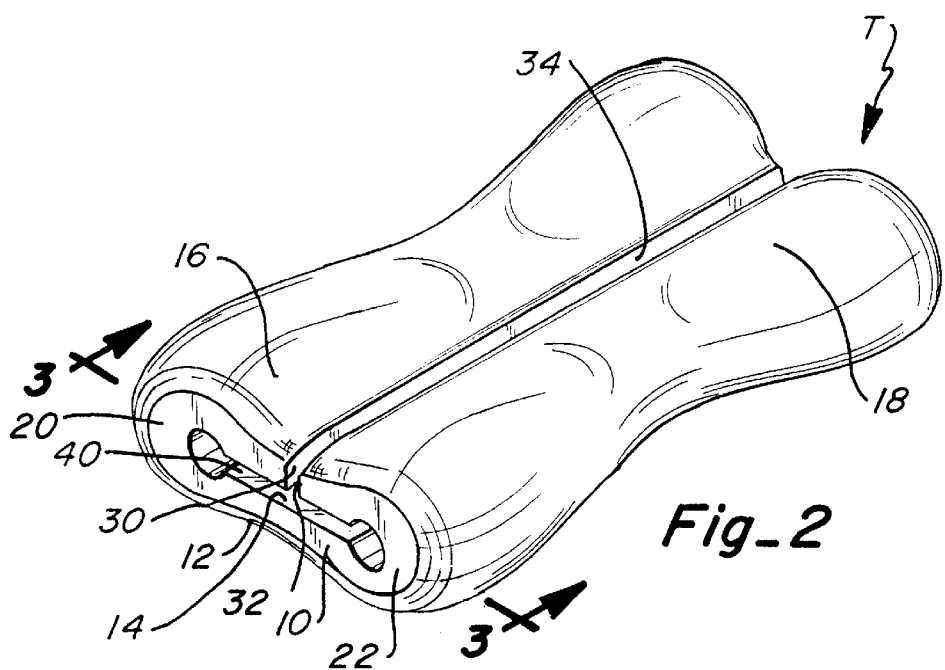
Fig_2

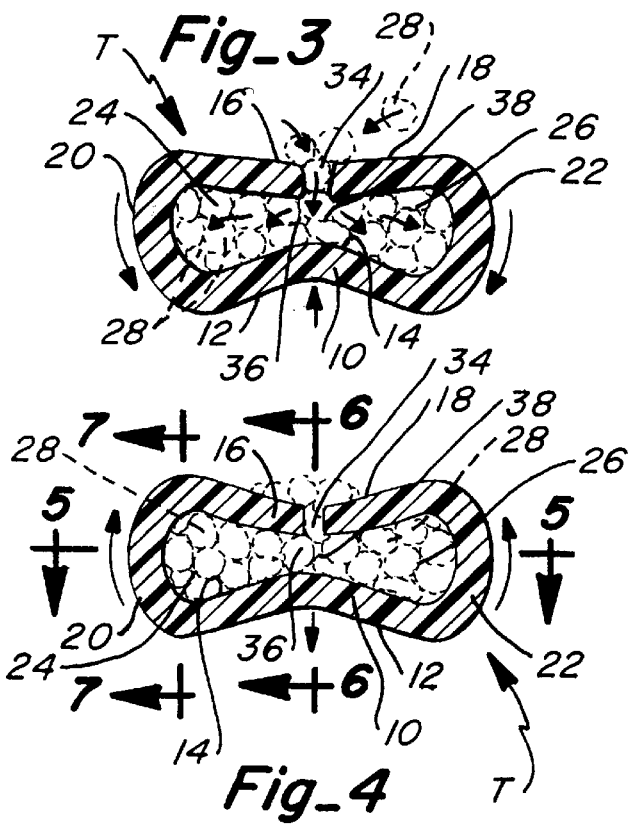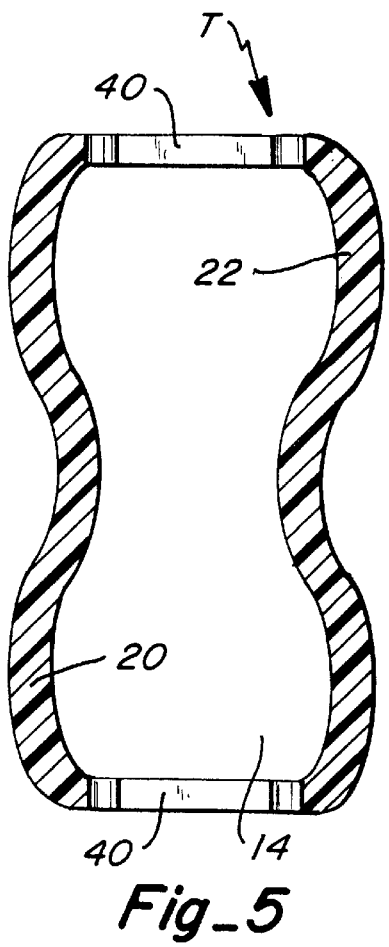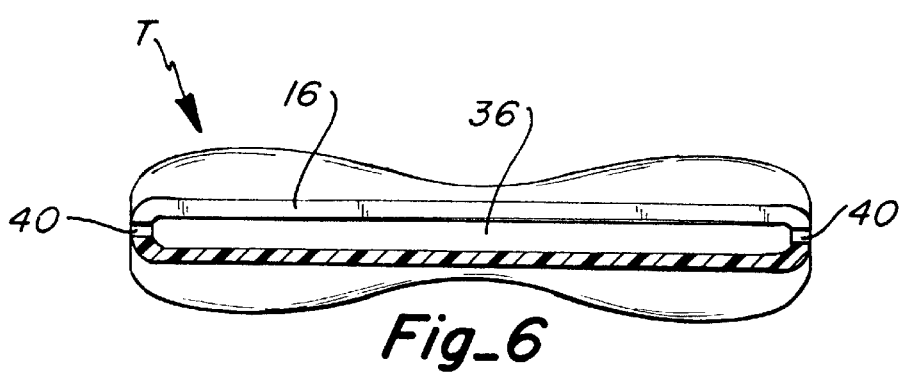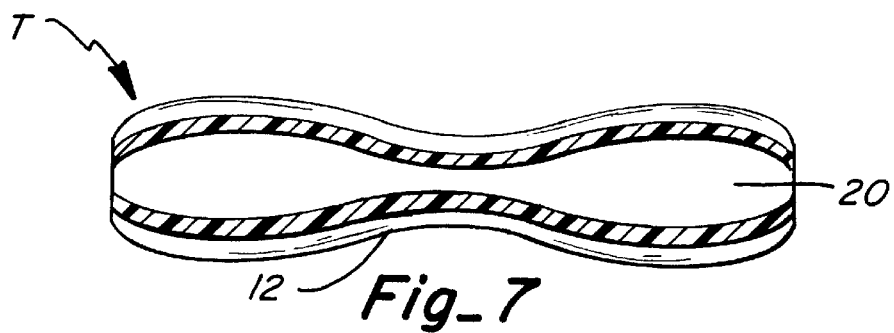

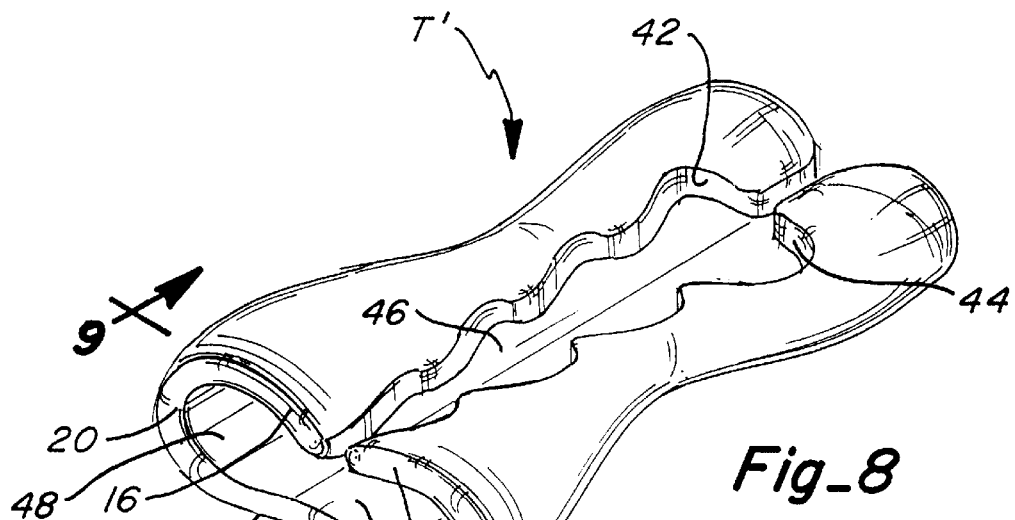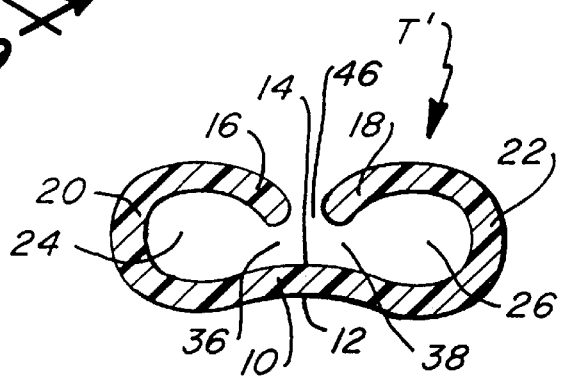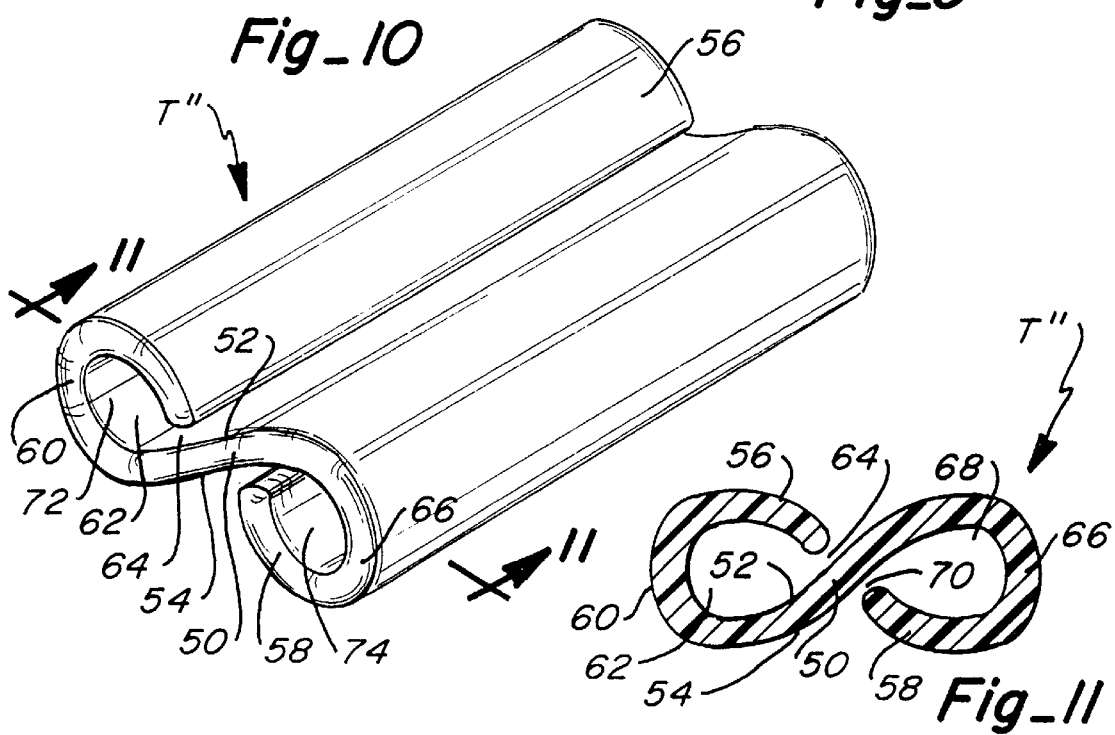

PET TOY PRODUCT WITH INTEGRAL TREAT RECEIVING RECEPTACLES

TECHNICAL FIELD

This invention relates to a pet toy and particularly to an elastomeric pet toy which can receive treats which are dispensed in response to deformation by an animal chewing on the pet toy.

BACKGROUND ART

Chewable pet toys have been available for many years. Many are impregnated with odors or flavoring materials which are attractive to the animal for which the toy is intended. These toys can be made of various materials, such as rawhide, rubber and plastic. The shortcoming of these products is that after a period of time, the flavor and/or odor becomes less strong and the animal loses interest in the toy. No means is provided for subsequently enhancing the flavor and odor of the toy.

Other pet toys have been developed wherein a treat is placed inside the toy so that the pet is attracted to the toy. In some cases, the treat will be randomly discharged from the toy due to the manipulation of the toy by the animal. However, the animal is not always rewarded for its efforts since the discharge of the treat does not necessarily occur directly in response to a particular act of the animal, such as chewing on the toy.

Gordon U.S. Pat. No. 4,928,632 discloses an elongated hollow cat toy having a plurality of normally closed pores throughout its surface. A treat, such as catnip, is placed inside the toy. When the toy is manipulated by the cat, some of the pores are opened temporarily to allow escape of odor and some of the catnip.

Houghton, et al. U.S. Pat. No. 5,343,828 discloses a puzzle toy designed for primates. The toy is spherical and has a plurality of holes through its surface. Pellets of food are placed inside the toy. The dimensions of the holes are such that the pellets will pass through the holes only when in a certain orientation. Also, the corners or edges of the pellets may extend through the holes so that the primate can chew on them until they are small enough to pass through the holes.

Edwards U.S. Pat. Nos. 4,513,014 and 4,557,219 each disclose a toy having a flavor therein which migrates to the surface of the toy as it is chewed by an animal. A longitudinal groove in the toy could be used to hold a treat, but that is not suggested by the patents.

Gordon U.S. Pat. No. 5,191,856 discloses an elongated hollow toy for receiving an odor producing material. It has openings to allow the odor to escape from the toy but small enough to prevent the odor inducing material from escaping.

Cousin U.S. Pat. No. 1,006,182 discloses a barrel shaped toy for holding catnip and the like. It has openings at one end for escape of odor and of the catnip from time to time as the animal plays with it.

Axlerod U.S. Pat. No. 5,339,771 discloses a bone shaped toy having animal meal dispersed within the plastic from which it is manufactured. As the toy is chewed, the animal will periodically encounter he animal meal which will enhance the animal's enjoyment of the toy.

Strahl German Patent No. 3,306,835 discloses a double walled ring with a split section which is filled with porous strips to which are added certain scents which attract a dog. This device can be placed around the trunk of a tree.

DISCLOSURE OF THE INVENTION

This invention relates to an elongated elastomeric pet toy which includes a longitudinal panel with first and second lips formed along respective longitudinal edges of the panel. These edges are folded over to form a bight which serves as a deformable hollow shape-retaining receptacle for receiving animal treats. The term "treats" as defined herein refers to any animal consumable product, for example, traditional pet food, vitamins or traditional human food. The lips form a longitudinal slit along the panel through which the treat can be inserted in the respective receptacles. When the animal chews on the pet toy, it will be deformed and the treats will be forced out through the longitudinal slit so that the animal can eat them. Also, the receptacles may have open ends through which the treats can be inserted by a person and dispensed from the toy due to deformation when the animal chews on the toy.

In one embodiment, the respective lips are folded over on the same side of the panel to form two adjacent receptacles. The lips are positioned adjacent each other to form a longitudinal slot through which treats can be inserted through the respective slots and into each receptacle.

Conveniently, in a second embodiment the longitudinal slot can have an irregular configuration for receiving different sizes of treats.

In a third embodiment, the lips are folded over to form a bight on opposite sides of the panel, respectively, so that the pet toy has a generally S-shaped configuration with two adjacent receptacles for receiving and dispensing the treats in the manner described above.

BRIEF DESCRIPTION OF THE DRAWINGS

FIG. 1 is a perspective view of an animal, such as a dog, chewing on one form of the present invention;

FIG. 2 is a perspective view of the pet toy shown in FIG. 1;

FIG. 3 is a vertical section, taken along line 3—3 of FIG. 2, showing treats being inserted into the toy;

FIG. 4 is a vertical section, similar to FIG. 3, but showing how the treats are dispensed from the toy due to the deformation caused by the chewing action of the animal;

FIG. 5 is a horizontal section, taken along line 5—5 of FIG. 4, showing the cross-sectional shape of the toy;

FIG. 6 is a vertical section, taken along line 6—6 of FIG. 4, showing the slot for inserting and dispensing the treats;

FIG. 7 is a vertical section, taken along line 7—7 of FIG. 4, showing the interior cross-section of the toy;

FIG. 8 is a perspective view of a second embodiment of this invention;

FIG. 9 is a vertical section, taken along line 9—9 of FIG. 8, showing the interior cross-section thereof;

FIG. 10 is a perspective view of a third embodiment of this invention; and

FIG. 11 is a vertical section, taken along line 11—11 of FIG. 10, showing the interior cross-section thereof.

BEST MODE FOR CARRYING OUT THE INVENTION

In accordance with the present invention, a pet toy T is provided for the enjoyment of an animal, such as dog D. Although the use of the toy is described with respect to a dog, it should be understood that the toy can be used with other animals, particularly cats and primates.

Toy T is made of elastomeric material and, as best seen in FIGS. 1–7, includes an elongated panel 10 having a first exterior side 12 and a second interior side 14. The elongated panel 10 has opposite longitudinal side edges formed as lips 16 and 18, respectively, which are folded over on the interior side 14 of panel 10 to form bights 20 and 22, respectively, which, in turn, create adjacent deformable hollow shape-retaining receptacles 24 and 26, respectively, for receiving treats 28. Lips 16 and 18 have adjacent longitudinal edges 30 and 32, respectively, which form a slot 34 between them, as best seen in FIGS. 2–4. The space between lip 16 and the interior side 14 forms a slit 36. Similarly, the space between lip 18 and interior side 14 forms a slit 38. The ends of the toy each have an opening 40, as shown. The treats 28 may be inserted by a person through slot 34 and slits 36 and 38 and/or through openings 40. The treats are dispensed by an animal chewing on the toy so as to deform it and, by so doing, squeezing one or more of the treats 28 through one or more of the respective slits 36 and 38, slot 34 and openings 40.

A second embodiment is shown in FIGS. 8 and 9. Pet toy T' is similar to toy T but lip 16 has an irregular edge 42 and lip 18 has an irregular edge 44 which form an irregular opening 46 through which treats of various sizes may be inserted. Pet toy T' also has a larger end openings 48.

A third embodiment is shown in FIGS. 10 and 11 wherein a pet toy T" is S-shaped. It has an elongated panel 50 which has a first side 52 and a second side 54 with opposite side edges formed as lips 56 and 58, respectively. Lip 56 is folded over toward first side 52 of panel 50 to form a bight 60. Lip 56 and the first side 52 form a receptacle 62 for receiving treats. The treats can be inserted through a slit 64 formed between the end of lip 56 and first side 52, as best seen in FIG. 11. Similarly, lip 58 is folded over toward second side 54 of panel 50 to form a bight 66. Lip 58 and the second side 54 form a deformable hollow shape-retaining receptacle 68 for receiving treats. The treats can be inserted through a slit 70 formed between the end of lip 58 and the second side 54. Conveniently, receptacle 62 has opposite open ends 72 and receptacle 68 has opposite open ends 74 through which treats may be inserted into the respective receptacles. As in the previous embodiments, when an animal chews on toy T" it will be deformed causing the treats to be forced through slits 64 and 70 and/or open ends 72 and 74. Thus, the manipulation of the toy by the animal rewards the animal since the treats are dispensed in response to this manipulation.

This invention has been described in detail with reference to particular embodiments thereof, but it will be understood that various other modifications can be effected within the spirit and scope of this invention.

It is claimed:

1. A generally elongated pet toy made of elastomeric material which can be deformed by an animal chewing on said toy, said toy comprising:

a longitudinal panel having opposed first and second sides, opposite first and second ends, a first longitudinal edge and a second longitudinal edge;

a first lip formed along said first longitudinal edge, said first lip being folded over so as to be positioned adjacent one of said first and second sides of said longitudinal panel to form a first deformable hollow shape-retaining treat receiving receptacle extending longitudinally along one of said first and second sides of said longitudinal panel, said first treat receiving receptacle being open at said first end for inserting treats therein and for dispensing treats from said toy upon deformation of said first treat receiving receptacle when said toy is chewed by the animal.

2. Apparatus, as claimed in claim 1, wherein:

said first treat receiving receptacle is open at both said first end and said second end for inserting treats into said toy and for dispensing treats from said toy when said toy is chewed by the animal.

3. Apparatus, as claimed in claim 1, wherein:

one side of said first and second sides of said panel and said first lip form a longitudinal slit along said pet toy for inserting treats into said first hollow treat receiving receptacle and for dispensing treats from said first hollow treat receiving receptacle when said toy is chewed by the animal.

4. A generally elongated pet toy made of elastomeric material which can be deformed by an animal chewing on said toy, said toy comprising:

a longitudinal panel having opposed first and second sides opposite first and second ends, a first longitudinal edge and a second longitudinal edge;

a first lip formed along said first longitudinal edge, said first lip being folded over so as to be positioned adjacent to one of said first and second sides of said longitudinal panel to form a first treat receiving receptacle extending longitudinally along one of said first and second sides of said longitudinal panel; and a second lip formed along said second longitudinal edge, said second lip being folded over so as to be positioned adjacent one of said first and second sides of said longitudinal panel to form a second treat receiving receptacle extending longitudinally along one of said first and second sides of said longitudinal panel.

5. Apparatus, as claimed in claim 4, wherein:

said second treat receiving receptacle has an open end for inserting treats into said toy and for dispensing treats from said toy when said toy is chewed by the animal.

6. Apparatus, as claimed in claim 5, wherein:

both said first and second receptacles are open at both said first end and said second end for inserting treats into said toy and for dispensing treats from said toy when said toy is chewed by the animal.

7. Apparatus, as claimed in claim 4, wherein:

one of said first and second sides of said panel and said second lip form a second longitudinal slit along said pet toy for inserting treats into said toy and for dispensing treats from said toy when said toy is chewed by the animal.

8. Apparatus, as claimed in claim 4, wherein:

both first and second lips are folded to be positioned adjacent to the same one of said first and second sides of said panel.

9. Apparatus, as claimed in claim 8, wherein:

said first and second lips are positioned adjacent each other to form a longitudinal opening therebetween for inserting treats into said toy and for dispensing treats from said toy when said toy is chewed by the animal.

10. Apparatus, as claimed in claim 9, wherein:

said longitudinal opening has an irregular shape.

11. Apparatus, as claimed in claim 4, wherein:

said first and second lips are folded to be positioned on opposite sides of said first and second sides of said panel to form first and second treat receptacles extending longitudinally along said opposite sides, respectively.

12. Apparatus, as claimed in claim 11, wherein:

said pet toy has a generally S-shaped configuration wherein said first treat receiving receptacle is adjacent said first side of said panel and said second treat receiving receptacle is adjacent said second side of said panel.

13. A generally elongated pet toy which includes a treat and is made of elastomeric material which can be deformed by an animal chewing on said toy, said toy comprising:

a longitudinal panel having opposed first and second sides, opposite first and second ends, a first longitudinal edge and a second longitudinal edge;

a first lip formed along said first longitudinal edge, said first lip being folded over so as to be positioned adjacent one of said first and second sides of said longitudinal panel to form a first deformable hollow shape-retaining treat receiving receptacle extending longitudinally along one of said first and second sides of said longitudinal panel, said first treat receiving receptacle being open at said first end for inserting treats into said first treat receiving receptacle and for dispensing treats from said toy upon deformation of said first treat receiving receptacle when said toy is chewed by the animal; and a first treat positioned in said first treat receiving receptacle.

14. Apparatus, as claimed in claim 13, wherein:

said first treat receiving receptacle is open at both said first end and said second end for inserting said first treat into said toy and for dispensing from said toy when said toy is chewed by the animal.

15. Apparatus, as claimed in claim 13, wherein:

one side of said first and second sides of said panel and said first lip form a longitudinal slit along said pet toy for inserting said first treat into said first treat receiving receptacle and for dispensing said first treat from said first treat receiving receptacle when said toy is chewed by the animal.

16. Apparatus, as claimed in claim 13, further including:

a second lip formed along said second longitudinal edge, said second lip being folded over so as to be positioned adjacent one of said first and second sides of said longitudinal panel to form a second deformed shape-retaining hollow treat receiving receptacle extending longitudinally along one of said first and second sides of said longitudinal panel; and a second treat positioned in said second treat receiving receptacle.

17. Apparatus, as claimed in claim 16, wherein:

said second hollow treat receiving receptacle has an open end for inserting said second treat into said toy and for dispensing said second treat from said toy when said toy is being chewed by the animal.

18. Apparatus, as claimed in claim 16, wherein:

both said first and second hollow treat receiving receptacles are open at said first end and said second end thereof for inserting said first and second treats, respectively, into said toy and for dispensing said first and second treats from said toy when said toy is chewed by the animal.

19. Apparatus, as claimed in claim 16, wherein:

one of said first and second sides of said panel and said second lip form a second longitudinal slit along said pet toy for inserting said second treat into said toy and for dispensing said second treat from said toy when said toy is chewed by the animal.

20. Apparatus, as claimed in claim 16, wherein:

both said first and second lips are folded to be positioned adjacent the same one of said first and second sides of said panel.

21. Apparatus, as claimed in claim 20, wherein:

said first and second lips are positioned adjacent each other to form a longitudinal opening therebetween for inserting said first and second treats, respectively, into said toy and for dispensing first and second treats from said toy when said toy is chewed by the animal.

22. Apparatus, as claimed in claim 21, wherein:

said longitudinal opening has an irregular shape.

23. Apparatus, as claimed in claim 16, wherein:

first and second lips are folded to be positioned on opposite sides of said first and second sides of said panel to form first and second hollow treat receiving receptacles extending longitudinally along said opposite sides, respectively.

24. Apparatus, as claimed in claim 23, wherein:

said pet toy has a generally S-shaped configuration wherein said first hollow treat receiving receptacle is adjacent said first side of said panel and said second hollow treat receiving receptacle is adjacent said second side of said panel.

* * * * *

UNITED STATES PATENT AND TRADEMARK OFFICE
CERTIFICATE OF CORRECTION

PATENT NO. : 5,832,877
DATED : November 10, 1998
INVENTOR(S) : Joseph P. Markham It is certified that error appears in the above-identified patent and that said Letters Patent is hereby corrected as shown below:

Column 1, line 58, after "encounter" delete "he" and insert --the--;
Column 5, line 41, delete "deformed shape-" and insert --deformable--;
Column 5, line 42, delete "retaining";
Column 5, line 42, after "hollow" insert --shape-retaining--.

Signed and Sealed this

Twenty-second Day of June, 1999

Attest:

Q. TODD DICKINSON

*Attesting Officer*     Acting Commissioner of Patents and Trademarks